Oct. 26, 1965  H. FUERST  3,214,187
COLLAPSIBLE CART
Filed Feb. 14, 1964
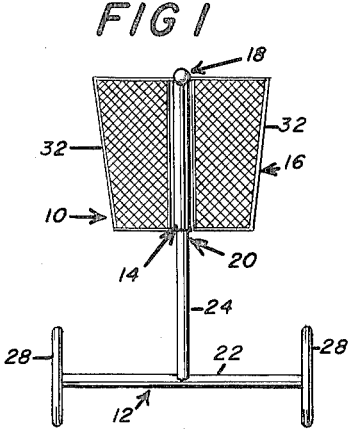
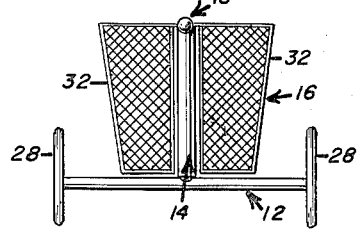
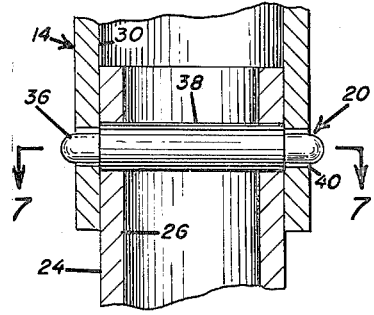
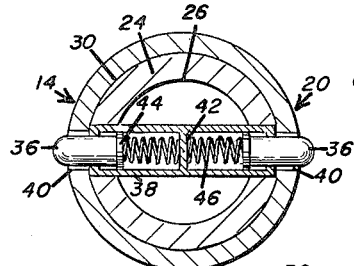
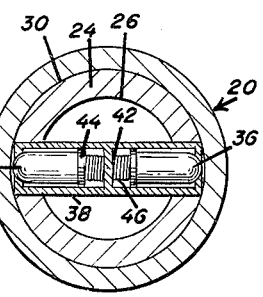
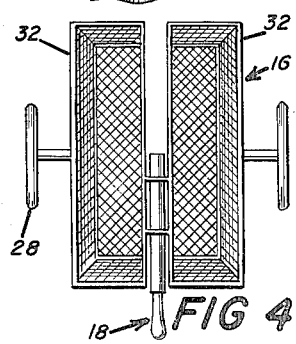
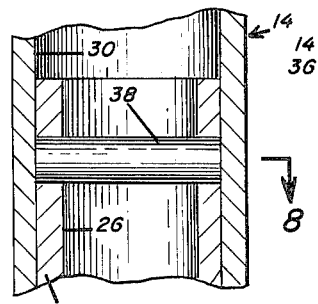
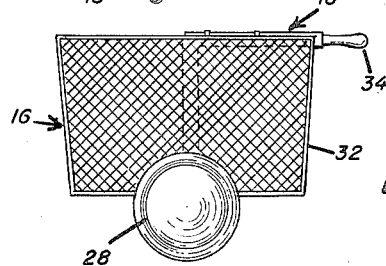
Herbert Fuerst
INVENTOR
BY Jacolie E. Davidson
ATTORNEYS 3,214,187
COLLAPSIBLE CART
Herbert Fuerst, Rick Bldg., Rocky Mount, N.C.
Filed Feb. 14, 1964, Ser. No. 344,966
5 Claims. (Cl. 280—36)

This invention relates generally to manually movable vehicles and more particularly to a collapsible cart which is capable of carrying school books and of being easily manually moved and collapsed in size by an average student.

School children are often required to carry several books to and from school each day and in certain instances, particularly with high school students, the weight and bulk of such books becomes almost prohibitive. Besides having one or more books for each class, a student being educated under current educational procedures is often required to carry on outside reading projects, to conduct research for term papers, and to engage in various other literary endeavors all of which serve to increase the number of books allotted to the student at any given time. It becomes unwieldy and impractical for a student to attempt to convey such a large number of books, or even a portion of them, between home and school each day, and the problem becomes even more acute when it is realized that, in addition to school books, a student must often transport other items such as lunches, gym clothes, posters, and the like.

Due to the fact that the students are often unable to cope with such loads of books and related school supplies, parents are forced to drive these students to and from school or to furnish them with an automobile for the same purpose. While this may be practical in instances where the student's home is quite remote from the school, it is not so practical when the student lives only a few blocks away from the school since he or she is deprived of the fresh air and exercise normally concomitant with walking to and from school. However, when a student is faced with the prospect of walking eight or ten blocks to school and home again with a ten-pound load of bulky books and related items, the prospect of being driven to school becomes more a necessity than a luxury.

It should also be recognized that continual carrying of school books tends to age the books quickly and the abuse which such books receive will often render them unfit for use after a year or two, thus greatly increasing the costs of the school district. In an effort to limit such abuse by reducing the number of times a book must be carried, many schools have installed lockers for use of the students. These lockers are often costly and use up valuable space on the school premises, but they do not generally accomplish their desired functions since homework, term papers and other similar projects require the student to have his books at home each evening rather than leaving them overnight in the locker.

Heretofore, the only vehicular devices which a student could use to carry his books to school were an automobile, bus or other motor-driven vehicle or a bicycle with a basket thereon. There was no specially designed vehicle which would expressly accommodate school books and supplies. It was, of course, possible to use vehicles such as shopping carts, grocery carts and the like, but these vehicles were generally too bulky and cumbersome to be satisfactorily employed for the task of transporting books.

It is, therefore, an object of the present invention to provide a mobile cart capable of transporting school books and related school supplies and to provide for said cart to be easily collapsed to reduce its overall size to facilitate its storage.

Another object of this invention is to provide a collapsible cart which can be easily moved between its distended and collapsed positions by an average person having no special mechanical skill or training.

Another object of this invention is to provide a wheeled book-carrying cart having improved means for manipulating the book-containing receptacle means relative to the wheels.

Another object of this invention is to provide a lightweight, inexpensive cart which can be easily pushed and easily collapsed in size and which has a book-carrying receptacle means which permits viewing of the books while they are contained within the cart.

Other objects, advantages and salient features of the invention will become apparent from the following detailed description, which, taken in connection with the annexed drawings, discloses a preferred embodiment thereof.

Referring to the drawings:

FIGURE 1 is an end view of a collapsible cart in accordance with the present invention, with said cart being in its distended position;

FIGURE 2 is an end view, similar to FIGURE 1, but showing the cart in its collapsed position;

FIGURE 3 is a side view of the collapsed cart of FIGURE 2;

FIGURE 4 is a plan view of a collapsible cart in accordance with the present invention;

FIGURE 5 is an enlarged fragmentary sectional view illustrating the cart-locking means in its operative position;

FIGURE 6 is a view similar to FIGURE 5 but showing the cart-locking means in its released position;

FIGURE 7 is a transverse sectional view taken substantially along line 7—7 of FIGURE 5 and illustrating the details of the cart-locking means in its operative position, and FIGURE 8 is a transverse sectional view taken substantially along line 8—8 of FIGURE 6 and illustrating the details of the cart-locking means in its released position.

In accordance with the principles of the present invention, and as can be seen generally in FIGURES 1 through 4, there is provided a collapsible cart generally designated 10 and having a base frame generally designated 12, a support member generally designated 14 mounted upon the base frame, receptacle means generally designated 16 affixed to the support member, an operating handle generally designated 18 attached to the support member for moving said cart, and locking means generally designated 20, with the support member 14 and the locking means 20 cooperating to provide means for moving the receptacle means 16 relative to the base frame 12 to collapse the cart 10 and thereby reduce its size.

The base frame 12, as can best be seen in FIGURE 1, includes a transverse portion or axle 22 and an elongated tubular upright portion 24 extending normally to the transverse portion at the center thereof. Although the upright portion 24 may be formed as a solid shaft, in the preferred embodiment as shown in FIGURES 5 and 6, the portion 24 has a central bore or cavity 26. Preferably, the transverse portion 22 is also formed as a hollow tubular member, thus reducing the overall weight of the cart 10.

At the outer ends of the base frame transverse portion 22, a pair of ground-engaging wheels 28 are rotatably mounted. These wheels may be suitably journaled onto the portion 22 by means of conventional bearings and may be retained at the ends of the portion 22 by means of acorn nuts or other similar expendients as will be apparent to those skilled in the art. Although the diameter of the wheels 28 is not a critical factor, it is preferred that it be small, both for the purpose of reducing weight and for the purpose of locating the base frame transverse portion close to the ground. Thus, when the cart 10 is in the collapsed position shown in FIGURE 3, the bottom of the receptacle means 16 is also located quite close to the ground and any tendency toward tipping of the cart is minimized since the outer bottom edge of the receptacle means 16 will contact the ground and prevent the cart 10 from tipping more than a few degrees either forward or backward.

The support member 14 is an elongated tubular rod having a central bore or cavity 30 shaped similarly to, but slightly larger than, the base frame upright portion 24. In this manner, the central bore 30 telescopically receives the upright portion 24. Preferably, but not necessarily, the support member 14 is of substantially the same length as the base frame upright portion 24. Thus, when the cart 10 is collapsed, as shown in FIGURE 2, the bottom edge of the support member 14 rests upon the base frame transverse portion 22.

The receptacle means 16 is comprised of a pair of baskets 32 which are polygonal in shape and open at their upper ends to receive the books and other similar items which are to be carried by the cart. These baskets 32 are disposed on opposite sides of the support member 14 and are suitably affixed thereto, either by temporary means such as clips or clamps or by permanent means such as welding. The baskets are preferably fabricated of an open-meshed material such as wire netting to permit visual observation of their contents through their sides and ends as well as their open tops.

The operating handle 18 is affixed to the upper end of the support member 14 and extends perpendicularly therefrom between the spaced baskets 32, as can best be seen in FIGURE 4. The handle 18 is provided at its outer end with a manually engageable portion 34 which extends outward beyond the ends of the baskets 32, as seen in FIGURE 3. The operator of the cart 10 merely manually grasps the portion 34 and pushes or pulls the cart, thus causing the wheels 28 to rotate and thereby propel the cart 10 in the desired direction. Naturally, the speed and direction of the cart is manually controlled by the operator.

The cart 10 is illustrated in its distended or normal operating condition in FIGURE 1. In this position it can be conveniently loaded, unloaded, and transported by the operator. However, when the cart is not being used, it is desirable to reduce its size to permit it to be more readily stored. To this end, the cart 10 of the present invention is collapsible to a configuration of illustrated in FIGURES 2 and 3. The locking means 20 enables the cart 10 to be moved between its distended and collapsed positions.

As can be seen from FIGURES 5 through 8, the locking means 20 includes a pair of spaced opposed pins 36 mounted within a sleeve 38 which extends transversely across the base frame upright portion 24 near its upper end. A pair of aligned pin-receiving apertures 40 are provided near the lower end of the support member 14, and when these apertures 40 are aligned with the pins 36, the pins enter the apertures and extend therethrough (as shown in FIGURE 5, thus locking the suport member 14 and the base frame upright portion 24 in a position as shown in FIGURE 1 wherein the cart 10 is in its distended position. It will be noted that the outer ends of the pins 36 extend outward beyond the walls of the tubular support member 14 and are preferably rounded or contoured to provide smooth manually engageable surfaces. When it is desired to collapse the cart 10, the operator merely manually depresses or pushes inward on the pins 36, thus telescoping them into the sleeves 38 and out of the apertures 40. In this position the locking means 20 is released or inoperative, and the support member 14 is free to telescope over the base frame upright portion 14 as shown in FIGURE 6, thus moving the cart to a collapsed position as shown in FIGURE 2.

Referring now to FIGURES 7 and 8, it can be seen that the sleeve 38 is provided with a center crosswall 42 which divides the sleeve into two separate pin housing chambers. Each pin 36 is provided at its inner end with an enlarged portion 44 which is substantially the same diameter as the chamber within which it is mounted, thus assuring that the direction of pin travel will be only axial and that no angular movement can occur. A helical compression spring 46 is mounted between each enlarged portion 44 and the crosswall 42. In their normal position, as shown in FIGURE 7, the springs 46 bias the pins 36 outwardly and into a locking position. However, manual pressure on the outer ends of the pins 36 serves to compress the springs 46 to the position shown in FIGURE 8, in which the walls of the support member 14 block the outward movement of the pins 36 and thereby retain the springs in their compressed position wherein the locking means 20 is released. When, however, the apertures 40 are again aligned with the pins 36, the springs 46 decompress and push the pins outward into the operative locking position of FIGURE 7. It should be understood that the crosswall 42 can be eliminated, if desired, and a single elongated compression spring can be utilized, with each end of the spring bearing against an enlarged pin portion 44.

It will be apparent to those skilled in the art that various modifications may be made in the structure set forth hereinbefore without departing from the spirit and scope of the invention disclosed herein. For example, if the baskets are temporarily secured to the support member by clips, one basket can be removed and nested within the other basket to reduce the overall size of the cart for ready storage thereof when not in use. Also, the axle can be made collapsible to provide means for moving the wheels toward one another and thereby afford another manner of reducing the size of the cart for storage purposes. Moreover, the operating handle can be pivotally mounted to the support member to allow it to be fixed at an angle with, rather than perpendicularly to, the support member or to be folded into parallel contact with the support member to further reduce the overall size of the cart. Other similar modifications may become apparent in light of the present disclosure.

After reading the foregoing detailed description, it should be apparent that the objects set forth at the outset of this specification have been successfully achieved.

What is claimed is:

1. A collapsible mobile cart comprising:
   a base frame including a transverse portion and an axially elongated upright portion;
   spaced ground-engaging wheels rotatably mounted on said base frame transverse portion;
   a tubular support member having receptacle means mounted thereon;
   said tubular support member being telescopically mounted upon said base frame upright portion and being relatively movable axially thereof to convey said receptacle means between a distended position and a collapsed position;
   selectively operable locking means normally maintaining said receptacle means in said distended position but being manually releasable to permit said receptacle means to assume said collapsed position; and
   an operating handle affixed to said support member and manually engageable to move said cart upon said ground-engaging wheels.

2. A manually movable and collapsible book-transporting vehicle comprising:
   a base frame including a transverse portion and an axially elongated upright portion;
   spaced ground-engaging wheels rotatably mounted on opposite ends of said base frame transverse portion;

an elongated hollow tubular support member telescopically disposed upon said base frame upright portion for movement axially thereof;

receptacle means mounted on said support member and adapted to contain books;

said support member being axially movable relative to said upright portion to lower said receptacle means toward said wheels until said receptacle means reaches a collapsed position;

said support member also being axially movable relative to said upright portion to raise said receptacle means away from said wheels until said receptacle means reaches a distended position;

said support member having a pair of aligned apertures adjacent its lower end;

manually releasable locking means adjacent the upper end of said base frame upright portion;

said locking means including spring-biased opposed pins normally extending outward beyond said upright portion and into said aligned apertures to lock said upright portion and said support member against relative telescopic movement and to thus maintain said receptacle means in its distended position;

said locking means being manually releasable by inward pressure on said opposed pins to allow said support member to telescope axially downward over said upright portion and to thus move said receptacle means to its collapsed position whereat said vehicle is reduced in size; and an operating handle affixed to the upper end of said support member and extending therefrom to provide a manually engageable element by which an operator can move the vehicle upon its ground-engaging wheels.

3. A manually movable and collapsible book-transporting vehicle as defined in claim 2 but further characterized by a hollow sleeve extending across the upper end of said base frame upright portion with said pins being mounted within said sleeve at opposite ends thereof and spaced apart by at least one compression spring.

4. A manually movable and collapsible book-transporting vehicle as defined in claim 2 wherein said receptacle means includes a pair of baskets secured to opposite sides of said support member and spaced apart to provide a passage through which said operating handle can extend.

5. A manually movable and collapsible book-transporting vehicle as defined in claim 4 wherein said baskets are fabricated of open-meshed construction to facilitate viewing of the contents thereof.

References Cited by the Examiner
UNITED STATES PATENTS

| | | | |
|---|---|---|---|
| 2,319,992 | 5/43 | Hubbard | 287—58 |
| 2,422,862 | 6/47 | Stottrup | 280—36 |
| 2,583,644 | 1/52 | Grimes | 280—36 |
| 2,600,611 | 6/52 | Bevington | 280—36 |
| 3,103,375 | 9/63 | McMullin | 248—191 X |

ARTHUR L. LA POINT, *Primary Examiner.*